United States Patent
Lemay et al.

(10) Patent No.: US 9,810,360 B2
(45) Date of Patent: Nov. 7, 2017

(54) QUICK COUPLING FOR CONNECTING DURING FLUID FLOW IN A HYDRAULIC CIRCUIT

(71) Applicant: Parker-Hannifin Corporation, Cleveland, OH (US)

(72) Inventors: Paul E. Lemay, Saint Paul, MN (US); Timothy T. Marquis, Otsego, MN (US); Michael R. Gose, Frederic, WI (US); Andrew J. Holst, Plymouth, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 252 days.

(21) Appl. No.: 14/429,567

(22) PCT Filed: Mar. 8, 2013

(86) PCT No.: PCT/US2013/029824
§ 371 (c)(1),
(2) Date: Mar. 19, 2015

(87) PCT Pub. No.: WO2014/058461
PCT Pub. Date: Apr. 17, 2014

(65) Prior Publication Data
US 2015/0233511 A1    Aug. 20, 2015

Related U.S. Application Data

(60) Provisional application No. 61/702,793, filed on Sep. 19, 2012.

(51) Int. Cl.
*F16L 37/34* (2006.01)
*F16L 37/35* (2006.01)
*F16L 37/56* (2006.01)

(52) U.S. Cl.
CPC ............... *F16L 37/34* (2013.01); *F16L 37/35* (2013.01); *F16L 37/565* (2013.01);
(Continued)

(58) Field of Classification Search
CPC .......... F16L 37/34; F16L 37/35; F16L 37/565
(Continued)

(56) References Cited

U.S. PATENT DOCUMENTS 5,159,955 A * 11/1992 Ekman ..................... F16L 37/23
                                                                137/614
5,191,914 A *  3/1993 Gonzalez ................ F16L 29/04
                                                                137/614

(Continued)

FOREIGN PATENT DOCUMENTS

WO          97/13095 A1     4/1997

OTHER PUBLICATIONS

International Search Report for corresponding patent application No. PCT/US2013/029824 dated Aug. 13, 2013.

*Primary Examiner* — Kevin Lee
(74) *Attorney, Agent, or Firm* — Renner, Otto, Boisselle & Sklar, LLP

(57) ABSTRACT

A coaxial coupling 10 includes a female coupling half 50 and a male coupling half 130. The coupling 10 is used in a hydraulic circuit 100 that includes a multistage hydraulic pump 101 and a hydraulic machine 102. The coupling is used in the circuit 100 to connect components when the pump is running. The coupling halves have a disconnected configuration (FIG. 1), a connection initiation configuration (FIG. 2), and a fully connected configuration (FIG. 3). Coupling half 50 includes a manually actuated restrictor 1 that signals the pump 101 to move to a low flow condition independently of load demand from the machine 102 in the connection initiation configuration. This reduces the forces (Continued)

required to move the coupling halves from the connection initiation configuration to the fully connected configuration.

29 Claims, 9 Drawing Sheets

(52) U.S. Cl.
CPC .. *Y10T 137/0491* (2015.04); *Y10T 137/87949* (2015.04); *Y10T 137/87957* (2015.04)

(58) Field of Classification Search
USPC .................................................. 137/614.03
See application file for complete search history.

(56) References Cited

U.S. PATENT DOCUMENTS

| | | | |
|---|---|---|---|
| 6,619,021 B1 | 9/2003 | Chaney et al. | |
| 7,147,003 B2 | 12/2006 | Maldavs | |
| 7,836,912 B2* | 11/2010 | Jang et al. | H01M 8/04201 137/614.03 |
| 8,387,949 B2* | 3/2013 | Ekstrom | F16L 37/252 137/614.03 |
| 8,602,056 B2* | 12/2013 | Schutz | F16L 37/34 137/614.03 |

* cited by examiner

QUICK COUPLING FOR CONNECTING DURING FLUID FLOW IN A HYDRAULIC CIRCUIT

CROSS REFERENCE TO RELATED APPLICATIONS

This application is a national phase of International Application No. PCT/US2013/029824 filed Mar. 8, 2013 and published in the English language, which claims priority of U.S. Provisional Application No. 61/702,793 filed Sep. 19, 2012.

TECHNICAL FIELD

This invention relates to quick couplings. More specifically, this invention relates to quick couplings for connecting during fluid flow in a hydraulic circuit.

BACKGROUND OF THE INVENTION

Quick couplings, including coaxial quick couplings, are widely used to connect and disconnect hydraulic components in numerous applications. For example, several such applications involve hydraulic circuits in which one hydraulic hose receives supply or higher pressure hydraulic fluid from a pressure source such as a hydraulic pump and conveys the supply pressure hydraulic fluid from the pump to a tool or equipment that uses the supply pressure hydraulic fluid to perform work. A second hydraulic hose, which may be separate from the first hose or may be coaxially arranged about the first hose to provide a coaxial hose arrangement, receives return or lower pressure hydraulic fluid from the equipment and conveys the return pressure hydraulic fluid from the equipment to a fluid reservoir that is connected back to the hydraulic pump. In these described exemplary applications, a coaxial quick coupling or other type of quick coupling may be used to connect the hoses to the equipment, and/or to connect the hoses to the pump, and/or to connect hoses to one another in order to extend the distance between the pump and the equipment.

In these examples involving coaxial quick couplings, the coaxial quick coupling includes first and second coupling members or coupling halves that are quickly connected to and disconnected from one another. Each of the coupling halves includes a supply pressure passage that conveys higher pressure fluid from the pump to the equipment and a return pressure passage that conveys lower pressure fluid from the equipment back to the pump. Valves are provided that close to prevent flow or leakage from the passages when the coupling members are disconnected from one another. The valves open to allow fluid flow between the supply passages of the first and second coupling halves, and between the return passages of the first and second coupling halves, when the coupling halves are connected to one another.

U.S. Pat. Nos. 7,147,003 and 7,584,764 to Ojars Maldavs ("Maldavs patents") disclose and explain the operation and method of a coaxial quick coupling ("Maldavs coupling") of the above described general type. The Maldavs coupling today is widely and successfully used in emergency applications in which emergency rescue equipment is connected by hydraulic hose to a hydraulic pump. In these applications, the hydraulic pump may be located at or near a rescue vehicle that has an engine to power the hydraulic pump. The rescue equipment may be used at a location remote from the hydraulic pump such as, for example, at the location of an industrial or motor vehicle or other accident. The hydraulic hose extends between and carries the hydraulic fluid between the hydraulic pump and the remote rescue equipment.

The Maldavs coupling facilitates connecting the coupling halves when the hydraulic pump is running and higher pressure hydraulic fluid is flowing through the hose from the pump to one of the coupling halves and lower pressure hydraulic fluid is returning from the one coupling half back to the pump. The forces created by fluid pressure acting against various components of the one coupling half must be manually pushed against and overcome by the operator during connecting of the coupling halves to open the valves in the one coupling half. The lower return fluid pressure is utilized in the Maldavs coupling to reduce any fluid pressure acting against these various components of the one coupling half during connecting. Because the return fluid pressure is low relative to the supply fluid pressure from the pump, the forces created by the return fluid pressure acting against the mentioned components is relatively low so that the connecting force is relatively low even when the hydraulic pump is running and hydraulic fluid is flowing through the hose from and back to the pump.

In some applications, it may be desirable to increase flow rates of the hydraulic fluid in order, for example, to accommodate use of larger rescue equipment. Also, in some applications it may be desirable to increase the length of the hose, including by connecting sections of hose together, in order to permit use of rescue equipment at a greater distance from the hydraulic pump. Further, it may be desirable to connect the coupling under cold weather conditions when the hydraulic fluid is relatively cold. When higher flow rates are desired or when longer hoses are desired or when low temperatures are encountered, the return pressure increases. The connecting forces in such applications are still reduced in the Maldavs coupling, but the higher return pressure increases the connecting forces above those in similar applications with lower fluid flow rates or shorter hoses or higher fluid temperatures. The present invention provides an improvement for the Maldavs coupling, and for other couplings including other coaxial and non-coaxial couplings, that addresses the technical problem of high connecting forces and reduces connecting forces and permits connecting when the pump is running under a wide variety of flow rates and hose lengths and fluid temperatures.

SUMMARY OF THE INVENTION

The present invention provides a quick coupling that may be connected with reduced operator connecting forces when connected during fluid flow, even with relatively high fluid flow rates and/or relatively long hoses and/or relative low fluid temperatures that result in relatively increased fluid pressures within the coupling.

The invention accomplishes this in one embodiment by providing a variable size restrictor in the fluid flow path. The restrictor is disposed in the supply passage. When the pump is operating and the coupling halves are disconnected, the variable restrictor is open to provide relatively unrestricted fluid flow through the coupling. When the pump is operating and the coupling halves are brought together to initiate a connection sequence under a condition in which the fluid pressure within the coupling is relatively higher such as may occur with relatively high flow rates or relatively long return hoses or relatively low fluid temperatures, the variable restrictor at least partially closes to restrict fluid flow. This increases fluid pressure upstream of the restrictor and reduces fluid pressure downstream of the restrictor and reduces the fluid flow.

The invention in another embodiment provides a hydraulic circuit having a multistage hydraulic pump having a first pump operating mode with a higher pump outlet flow rate and a lower pump outlet pressure, and a second pump operating mode with a lower pump outlet flow rate mode and a higher pump outlet pressure. In this embodiment, the increased fluid pressure upstream of the restrictor resulting from at least partially closing the variable restrictor at the initiation of a coupling connection sequence signals the pump to move from the higher flow rate first mode to the lower flow rate second mode. This sends a signal to the pump created by the coupling (as distinguished from a signal created and sent by the equipment to the pump) to require that the pump react as if the equipment in the circuit required that the pump operate in its low flow rate high pressure second mode. This causes the fluid flow rate through the coupling and through the return hose to be reduced during the remainder of the connecting sequence as the coupling valve or valves move from a closed configuration to an open configuration. This lower fluid flow rate reduces the pressure within the coupling and reduces the connection forces that are required by the human operator to complete the connection sequence and move the coupling halves to a fully connected configuration. Even though this signal created by the coupling increases the pump outlet pressure, the imposition of the at least partially closed variable restrictor of the invention prevents the increased pump outlet pressure from reaching the return passage. The reduced flow rate through the return passage of the coupling half and through the return hose results in a lower back pressure in the coupling half and in reduced connection forces during a remainder of the connection sequence. When the connection force applied by the operator is relieved, such as when the coupling is fully connected and fluid is flowing between the high pressure passages of the fully connected coupling halves and between the low pressure passages of the fully connected coupling halves, the restrictor returns to its open position to allow full flow through the coupling. Once this occurs, the pump will return to its first mode and then operate in a mode as required by the equipment in the hydraulic circuit rather than as dictated by the coupling.

These and additional features of the invention are more fully described and particularly pointed out in the description and claims set out below, and this summary is not intended to identify key features or essential features of the claimed subject matter. The following description and claims and the annexed drawings set forth in detail certain illustrative embodiments of the invention, and these embodiments indicate but a few of the various ways in which the principles of the invention may be used. The claims set out below are incorporated by reference in this summary.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
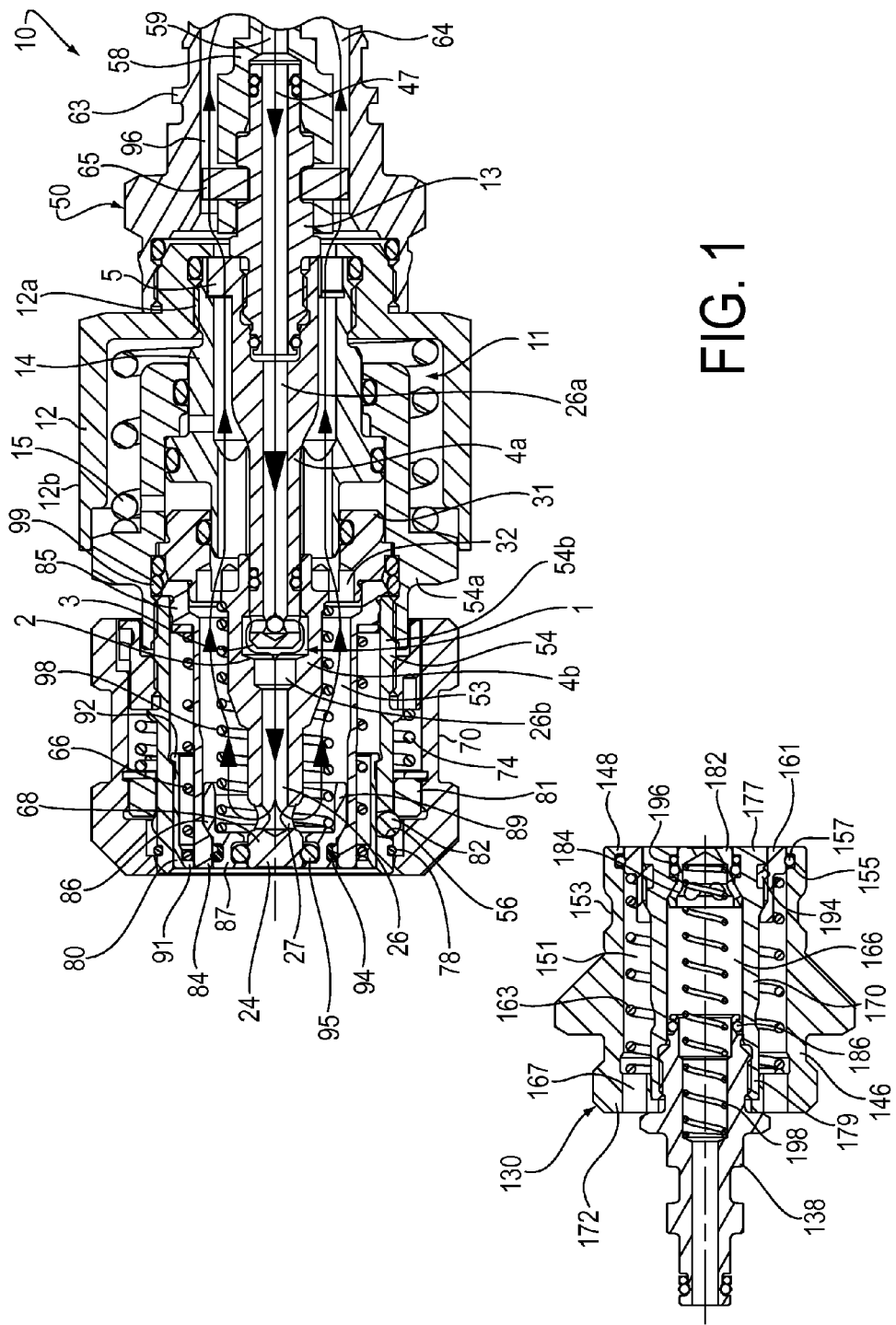
FIG. 1 is a longitudinal cross sectional view of a coaxial coupling according to a preferred embodiment of the present invention, showing first and second members or halves of the coupling in a disconnected configuration.

Referring now to the drawings in greater detail, FIG. 1 illustrates a first preferred embodiment of a quick coupling 10 according to the present invention. The first preferred embodiment of the present invention is described in the context of an improvement in the above referenced Maldavs coaxial coupling, and the drawings and description of the above referenced Maldavs patents are incorporated herein by reference. For clarity and brevity, the description herein uses many of the reference numbers used in the Maldavs patents and uses some but not all of the description from the Maldavs patents. The Maldavs patents may be referenced for a more complete understanding of the structure and function and method of the Maldavs coupling. It is to be understood that the present invention may be used in a coupling of the type disclosed and claimed in the Maldavs patents, or may alternatively be used in other coaxial and non-coaxial coupling types.

As explained in the Maldavs patents, coaxial coupling 10 includes a female half 50 and a male half 130. The female half 50 may also be called a first coupling member or female coupling member 50, and the male half 130 may also be called a second coupling member or male coupling member 130. Male coupling member 130 is attached to both a first high pressure hose fitting or connector 138 and a first low pressure hose fitting or connector (not shown in FIG. 1 but adapted to be threaded onto the left end of the male coupling exterior body 146 in the manner shown in the Maldavs patents), which are coaxial with each other. Female coupling member 50 is attached to both a second high pressure hose fitting or connector 58 and a second low pressure hose fitting or connector 63, again coaxial with each other.

In the coupling illustrated in FIG. 1, a spacer or C-clip 65 is added to retain fitting 58, and the spacer 65 includes at least one longitudinal passage to allow for fluid flow between fittings 58 and 63. An inner high pressure fluid supply chamber or flow passage (indicated by flow arrow 47) through coupling 10 and high pressure hose fittings 58, 138 serves as the high pressure fluid supply line leading from a pump to a tool or equipment further described below. The coaxial outer low pressure return or reservoir fluid chamber or outer flow passage (indicated by flow arrow 96) through coupling 10 and low pressure hose fitting 63 serves as the low pressure return line leading from the tool or equipment back to the pump further described below.

Still referring to FIG. 1, female coupling member 50 includes an exterior cylindrical body 54, which includes a first cylindrical body portion 54a and a second cylindrical body portion 54b that are threadably attached together as shown. As distinguished from the Maldavs coupling, the cylindrical body 54 of the preferred embodiment of the invention illustrated in FIG. 1 is not fixedly connected to the second low pressure hose fitting 63, but instead is longitudinally movable relative to the low pressure hose fitting 63 as further explained below. Fitting 63 can have any desired outer geometry appropriate for being engaged by a conventional tool, and an inner geometry defining an internal cavity or passage 64 having a first end that is fluidly connected with an internal low pressure return fluid coupler passage 53 within female coupling member 50. If coupling half 50 is to be attached to a coaxial hose, the coaxial hose (not shown herein) is secured to the hose fittings of the coupling half 50 in a well known manner as generally illustrated in FIG. 7 of the Maldavs patents. Alternatively, coupling half 50 can be connected directly to a rigid block rather than to hoses. In this alternate arrangement, hose fittings 58 and 63 are eliminated and the coupling sleeve 12 is threadably connected to a machined cavity in a block in the manner generally illustrated in FIG. 8 of the Maldavs patents. In this alternate arrangement, the block, for example, can be the housing of a hydraulic pump, as further described below. Body 54 has a forward end with a plurality of circular openings 56, evenly spaced around its circumference, for receiving a plurality of locking balls 82.

A cylindrical locking collar 70 is received on the cylindrical body portion 54b and envelops a portion thereof. Locking collar 70 includes a known outer surface that may be knurled for easy grip by the user or operator. A spring 74 is located internally of collar 70 (housed within a cavity located between the outer surface of body 54 and the inner surface of collar 70) for urging locking collar 70 forwardly along body 54. A retaining ring 78 is provided to retain locking collar 70 in the position shown in FIG. 1. A locking sleeve 81 is securely positioned inside locking collar 70 to retain the locking balls 82 in a radially inward locked position in a well known manner when the coupling halves 50 and 130 are connected together as described below. Alternatively, the openings 56 and balls 82 and collar 70 and sleeve 81 can be replaced with other locking mechanisms for securing coupling halves 50 and 130 in their fully coupled configuration further described below.

Female coupling half 50 includes two valve assemblies. A first valve assembly 68 is affiliated with high pressure hose fitting 58 and is discussed further below. A second valve assembly includes an axially movable and spring biased cylindrical face sleeve 80, a coaxial cylindrical sealing sleeve 84 received within face sleeve 80, a coaxial cylindrical sealing sleeve 84 received within face sleeve 80, and a cylindrical valve body 86 located within sealing sleeve 84. Cylindrical face sleeve 80 is axially movable relative to cylindrical body 54 and is unidirectionally biased by spring 66. Cylindrical sealing sleeve 84 has a rear outwardly extending annular shoulder 85 and an O-ring 99 compressively sealed between annular shoulder 85 and body portion 54a. The second valve assembly is in fluid pressure communication with an outer low pressure fluid return passage 53 and serves to close and open fluid pressure communication between passage 53 and a corresponding outer low pressure fluid return passage in male coupling half 130 described further below.

Cylindrical face sleeve 80 is dimensioned so as to be closely received within cylindrical body 54 and moves axially with respect thereto. Face sleeve 80 includes an annular, radially-inwardly directed annular flange 91 at its front end, and a radially-outwardly directed annular flange 92 at its rear end. Rear flange 92 is designed to engage a radially-inwardly projecting annular shoulder on cylindrical body 54 to limit the forward movement of face sleeve 80 with respect to body 54. Spring 66 urges face sleeve 80 forwardly on body 54 and is disposed between the inner surface of annular flange 91 and an outer surface of annular shoulder 85 of sealing sleeve 84.

Valve body 86 is axially movable within cylindrical sealing sleeve 84 and is biased forwardly by a spring 98. Valve body 86 includes an enlarged forward valve head 87 with a flat front face and a rearward portion 89 having longitudinal channels for allowing fluid flow. Valve head 87 has an inner surface with a groove that houses an inner O-ring 95 and an outer surface with a groove that houses an outer seal 94. Seal 94 is preferably a molded seal that is bonded to valve head 87. Inner O-ring 95 provides a fluid tight seal between cylindrical valve body 86 and female high pressure inner valve 68. Outer seal 94 provides a fluid tight seal between cylindrical valve body 86 and an inwardly extending front shoulder of cylindrical sealing sleeve 84.

Female high pressure inner valve 68 includes a forward end 24 with a flat front face and an outer surface that sealingly abuts the inner surface of valve head 87, via inner O-ring 95, when female half 50 is in the uncoupled position shown in FIG. 1. An entire outer circumferential portion of forward end 24 contacts seal 95 ensuring that fluid inside passage 53 doesn't extend beyond this junction. Inner valve 68 has and is in fluid pressure communication with an inner high pressure fluid supply passage 26 and serves to open and close fluid pressure communication and flow between inner passage 26 and a corresponding inner supply passage in male coupling half 130 described below. Inner passage 26, in turn, is in fluid communication with and coaxial with an inner passage 59 inside second high pressure hose fitting 58 when same is physically attached to high pressure inner valve 68 as described below. High pressure inner valve 68 has a series of lateral radial passages 27 near forward end 24 that fluidly connect valve inner passage 26 with coupler outer low pressure return fluid passage 53 when female half 50 is in the uncoupled position, or is separated from male half 130, as shown in FIG. 1.

Continuing with reference numbers and description from the Maldavs patents, and still referring to FIG. 1 herein, male coupling half 130 includes a generally cylindrical plug or body 146 defining an inner high pressure fluid supply passage 151. Plug 146 has a flat annular front surface 148, which, when in the configurations illustrated in FIGS. 2 and 3, can be located flush against face sleeve inwardly-directed flange 91 of female half 50 and can be received within female cylindrical body 54. Plug 146 further includes a circumferential locking groove 153 in its outer surface and an inwardly facing groove 155 in its inner surface. A seal, or O-ring 157 is housed within groove 155 and prevents fluid within outer fluid passage 151 from escaping between plug 146 and an outer sealing sleeve 161 received on the inner peripheral surface of plug 146. The other end of plug 146 is fixedly interconnected, such as by cooperating threads, to an adjoining end of a low pressure fitting (not shown). A plurality of longitudinal flow passages 167 are integrated within a rear section 172 of cylindrical plug 146. A spring 163 is positioned within passage 151 and biases outer sleeve 161 towards the front end of male half 130. Specifically, spring 163 is disposed between an inner shoulder of cylindrical plug 146 and an outer shoulder of outer sealing sleeve 161. Outer sealing sleeve 161 is movable relative to cylindrical plug 146 and has a front face which abuts the annular frontal face of female cylindrical sealing sleeve 84 when coupled as in FIGS. 2 and 3.

Figure 2:
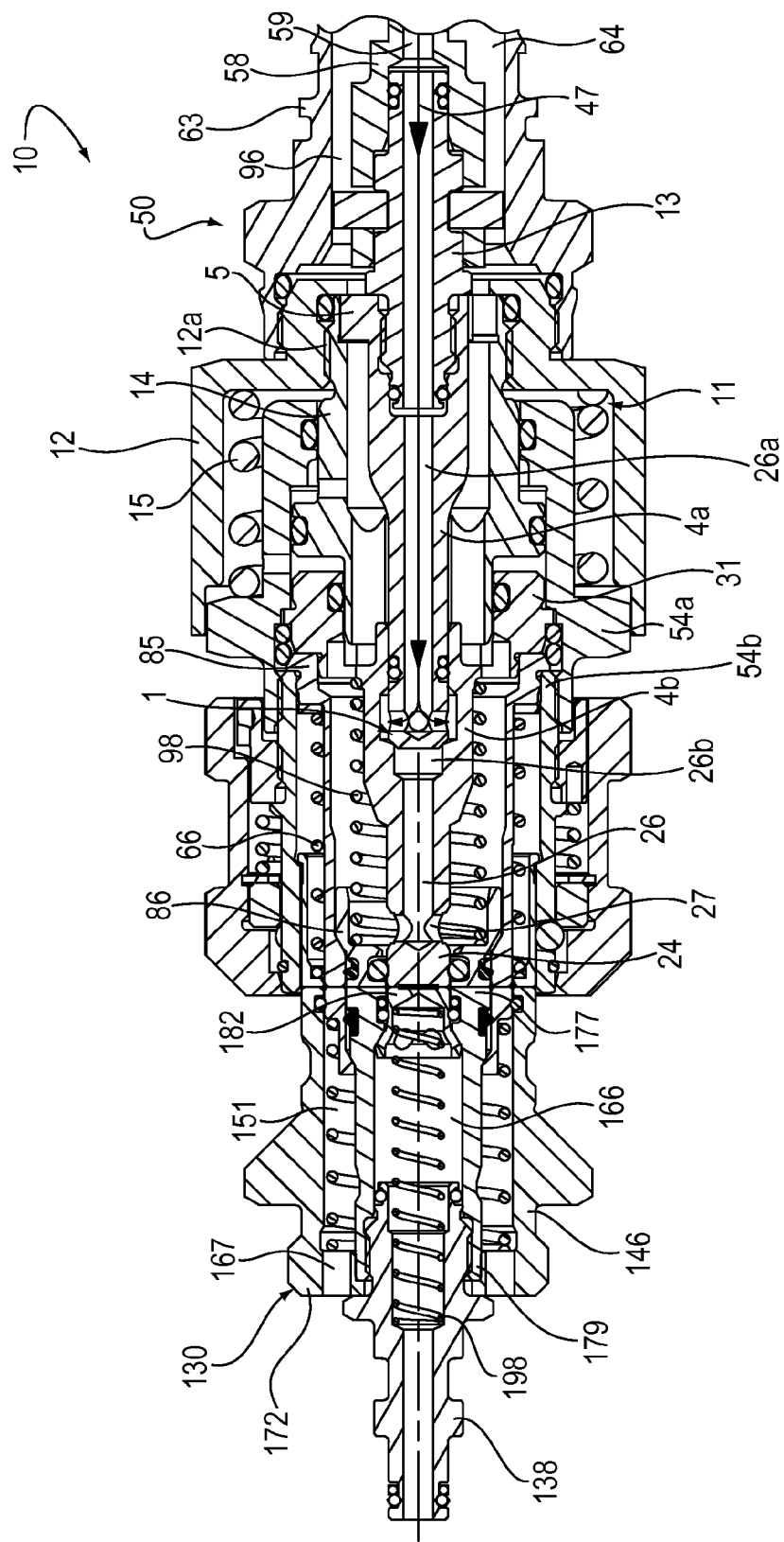
FIG. 2 is a longitudinal cross sectional view similar to FIG. 1, but showing the first and second halves of the coupling in a connection initiation configuration.
Figure 3:
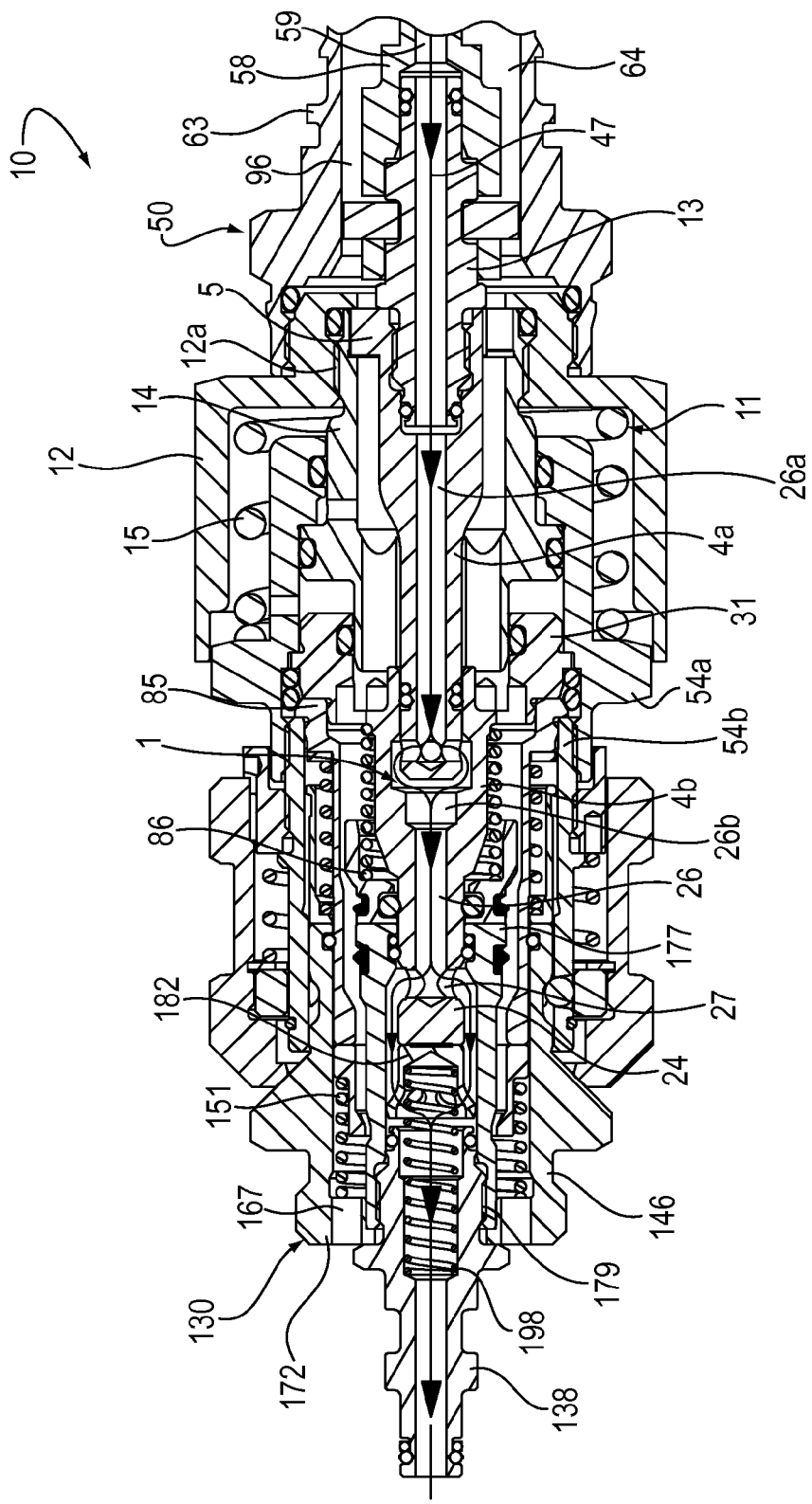
FIG. 3 is a longitudinal cross sectional view similar to FIG. 1, but showing the first and second halves of the coupling in a fully connected configuration.

An inner valve cylindrical body 170 has a front portion or head 177 that has a flat frontal annular surface that abuts the front face of female valve head 87 when in the configurations shown in FIGS. 2 and 3. Head 177 has an outer peripheral surface with a groove that houses a seal or O-ring 194 and an inner peripheral surface with a groove that houses another seal or O-ring 196. In the closed or uncoupled position shown in FIG. 1, O-ring 194 prevents fluid within fluid passage 151 from escaping between outer sleeve 161 and valve body 170, and O-ring 196 prevents fluid within an inner passage 166 from escaping between valve body 170 and an inner valve sealing element 182. Inner valve sealing element 182 has a flat frontal face that abuts the face of female high pressure inner valve forward end 24 when male half 130 is coupled with female half 50 as in FIGS. 2 and 3. A spring 198 biases valve element 182 forward such that a rear outer annular shoulder 184 thereof contacts a shoulder of valve body head 177. Specifically, spring 198 is disposed between the inner surface portion of valve element 182 and the inner stepped surface portion of high pressure hose fitting 138. Hose fitting 138 is preferably affixed to inner valve body 170 with threads at tail portion 179. The leading portion of fitting 138 has an O-ring seal 186, housed with a groove, which is press-fitted against the inner surface of inner valve body 170 to eliminate any clearance between fitting 138 and valve body 170. If coupling half 130 is to be attached to a coaxial hose, the coaxial hose (not shown) is secured to the hose fittings of the coupling half 130 in a well known manner as generally illustrated in FIG. 7 of the Maldavs patents. Alternatively, coupling half 130 can be connected directly to a rigid block rather than to hoses. In this alternate arrangement, the hose fittings of coupling half 130 are eliminated and the body 146 is threadably connected to a machined cavity in a block in the manner generally illustrated in FIG. 8 of the Maldavs patents. In this alternate arrangement, the block, for example, can be the housing of a machine or equipment, as further described below.

The structure of the coupling 10 as described above in this detailed description operates in the manner and according to the method further described in the Maldavs patents. Such known operation and method are not repeated in detail herein. The Maldavs patents explain that in the disconnected configuration and during connection of the male half 130 and female half 50, passages 26 and 53 are connected via side passages 27 in inner valve 68 and that this interconnection of coaxial paths within female coupler half 50 prevents any pressure build-up therein since any high pressure fluid within passage 26 travels directly to passage 53. By preventing any pressure build up in the female coupler half 50 by connecting high pressure passage 26 directly to return or reservoir passage 53, the connection forces required to open the valves in the female half 50 are minimized. The relatively low fluid pressure in the return or reservoir passage 53 is determined by the fluid flow rate through return passage 53 and through the return hose from the coupling 10 to the reservoir or pump. As is well known, relatively lower flow rates and relatively shorter hose lengths and relatively higher fluid temperatures will result in relatively lower fluid pressure in the return or reservoir passage 53. Because of this, the coupling described in the Maldavs patents works best at relatively lower fluid flow rates and/or with relatively shorter return hose lengths and/or at relatively higher fluid temperatures. The present invention provides an improvement in the coupling 10 described above in this detailed description and in the Maldavs patents and in other couplings and hydraulic circuits and methods, to permit the coupling to also work to reduce pressures and reduce connection forces at relatively higher fluid flow rates and/or with relatively longer return hose lengths and/or with relatively lower temperature fluid which result in relatively higher fluid pressure in the coupling 10 before a coupling sequence commences. The structure and operation and method of the improved coupling 10 according to the present invention will now be described.

Referring to FIG. 1, the present invention provides the coupling 10 with a variable size flow restrictor 1 and with a flow restrictor actuator 11. The flow restrictor 1 is upstream of the flow passage 27 that connects the inner high pressure fluid supply passage or chamber 26 with the outer low pressure fluid return or reservoir passage or chamber 53. The flow restrictor 1 includes a first flow restriction surface 2, which in the embodiment illustrated in FIG. 1 is an annular valve seat. The flow restrictor 1 also includes a second flow restriction surface 3, which in the embodiment illustrated in FIG. 1 is a valve head. The valve head 3 is axially or longitudinally movable toward and away from the valve seat 2 to change the size or opening of the variable flow restrictor 1. FIG. 1 illustrates the coupling 10 in a disconnected configuration, and the flow restrictor 1 in this configuration is fully open with the valve seat 2 spaced its maximum distance away from the valve head 3 to allow maximum flow through the restrictor 1.

The inner passage 26 provides a high pressure supply inner chamber or passage for the coupling 10 to receive and convey high pressure fluid from the fluid pump. First and second high pressure supply fluid flow tubes 4a and 4b are disposed within the exterior coupling body 54a, 54b, and the flow tube 4a is longitudinally movable relative to the flow tube 4b. The inner chamber or high pressure supply inner passage 26 includes a first inner chamber or passage portion 26a within the first flow tube 4a and a second inner chamber or passage portion 26b within the second flow tube 4b. The flow restrictor 1, including the annular valve seat 2 and the valve head 3, is disposed intermediate the flow tubes 4a and 4b upstream of the flow passage 27. The valve head 3 is a tapered end surface of second flow tube 4a, and annular valve seat 2 is an annular surface formed on a shoulder in second passage portion 26b in second flow tube 4b.

An annular spacer 31 is provided on the right end of flow tube 4b and is integral with flow tube 4b. A plurality of circumferentially spaced longitudinal flow passages 32 extend through spacer 31 to connect coupler passage 53 with low pressure hose fitting passage 64. The second flow tube 4)b is fixed against movement relative to the body 54a, 54b.

The first flow tube 4a is longitudinally movable relative to the second flow tube 4b and relative to the body 54a, 54b by operation of the actuator 11. The actuator 11 includes an actuator sleeve 12, which is threadably connected to hose fitting 63 so that sleeve 12 and hose fitting 63 move together relative to flow tube 4b and body 54a, 54b. The exterior surface 12b of sleeve 12 provides a gripping surface that may be gripped by a human operator, and the exterior surface of fitting 63 and the exterior surface of the low pressure hose (not shown) also provide gripping surfaces that may be gripped by a human operator in the manner described further below when coupling half 50 is connected to a hose. Alternatively, as mentioned above and described further below, sleeve 12 may be threadably connected to a stationary block, such as for example a hydraulic pump housing. In this alternate arrangement, sleeve 12 is not gripped by the operator during connection of the coupling halves 50 and 130. Instead, sleeve 12 remains stationary with the hydraulic pump, and coupling half 130 is gripped by the operator and pushed against and into stationary coupling half 50. A spacer 13 is threaded into the right end of flow tube 4a and is slidably connected to the left end of high pressure hose fitting 58, to provide a fluid tight connection between the flow tube 4a and the hose fitting 58. In the described alternate arrangement in which the hose fitting 58 is eliminated, spacer 13 is slidably connected to the described block. The actuator 11 further includes an actuator member 14 that is threaded onto an interior threaded surface 12a of the sleeve 12. The right end of first flow tube 4a includes a shoulder 5, and shoulder 5 is captured between the actuator member 14 and the sleeve 12. In this manner, sleeve 12 and actuator member 14 are connected to first flow tube 4a and its first flow restriction surface or valve head 3, so that axial or longitudinal movement of sleeve 12 and hose fitting 63 by action of the human operator causes valve head 3 to move relative to valve seat 2 to close and open variable flow restrictor 1. An actuator spring 15 acts between body member 54a and sleeve 12, to bias sleeve 12 and actuator member 13 and first flow tube 4a and valve head 3 to the right as viewed in FIG. 1, which biases the restrictor 1 to its open position.

Figure 8:
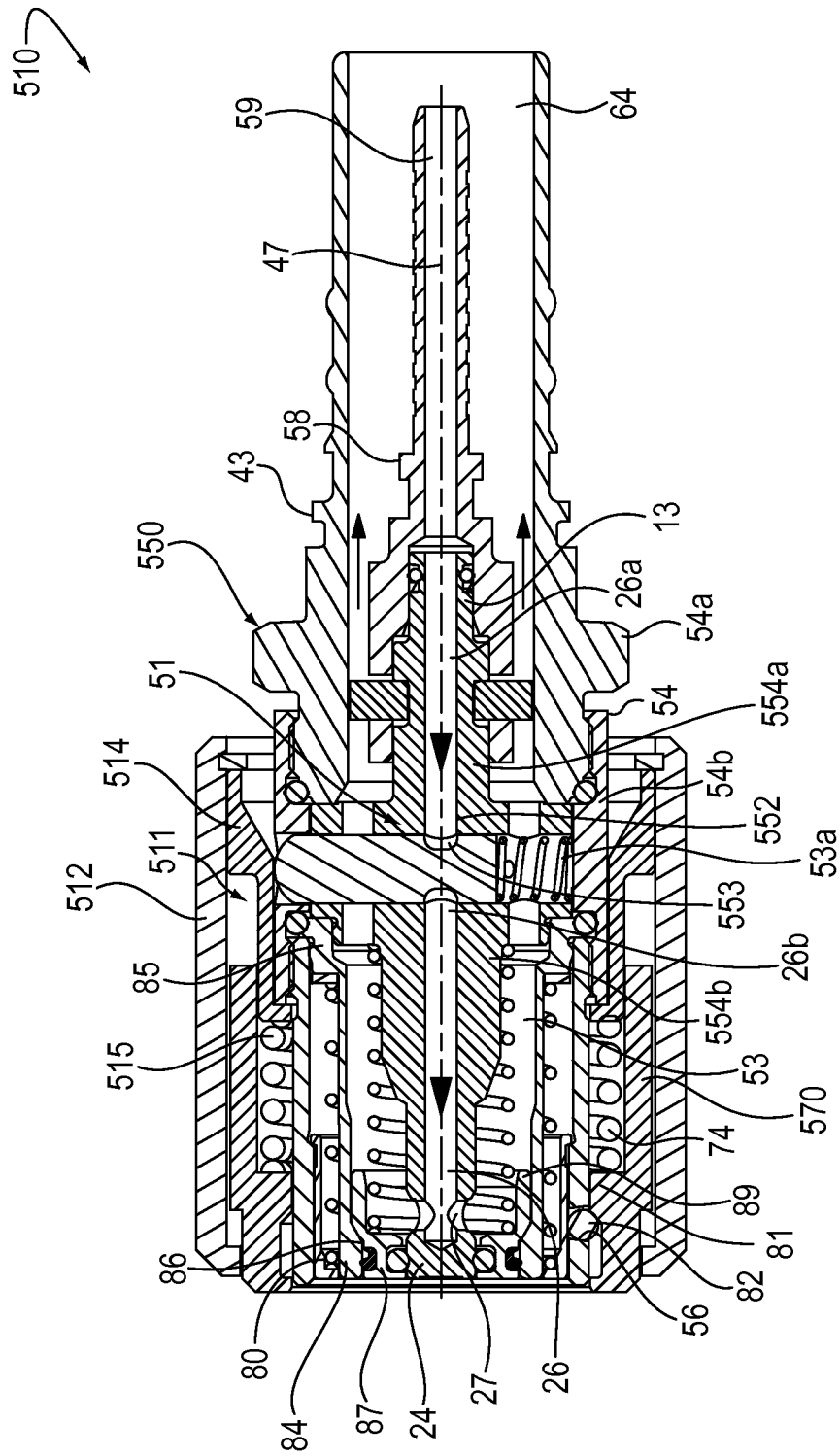
FIG. 8 is a longitudinal cross sectional view of a coaxial coupling according to a fifth embodiment of the present invention, showing one of the halves of the coupling in a disconnected configuration.
Figure 9:
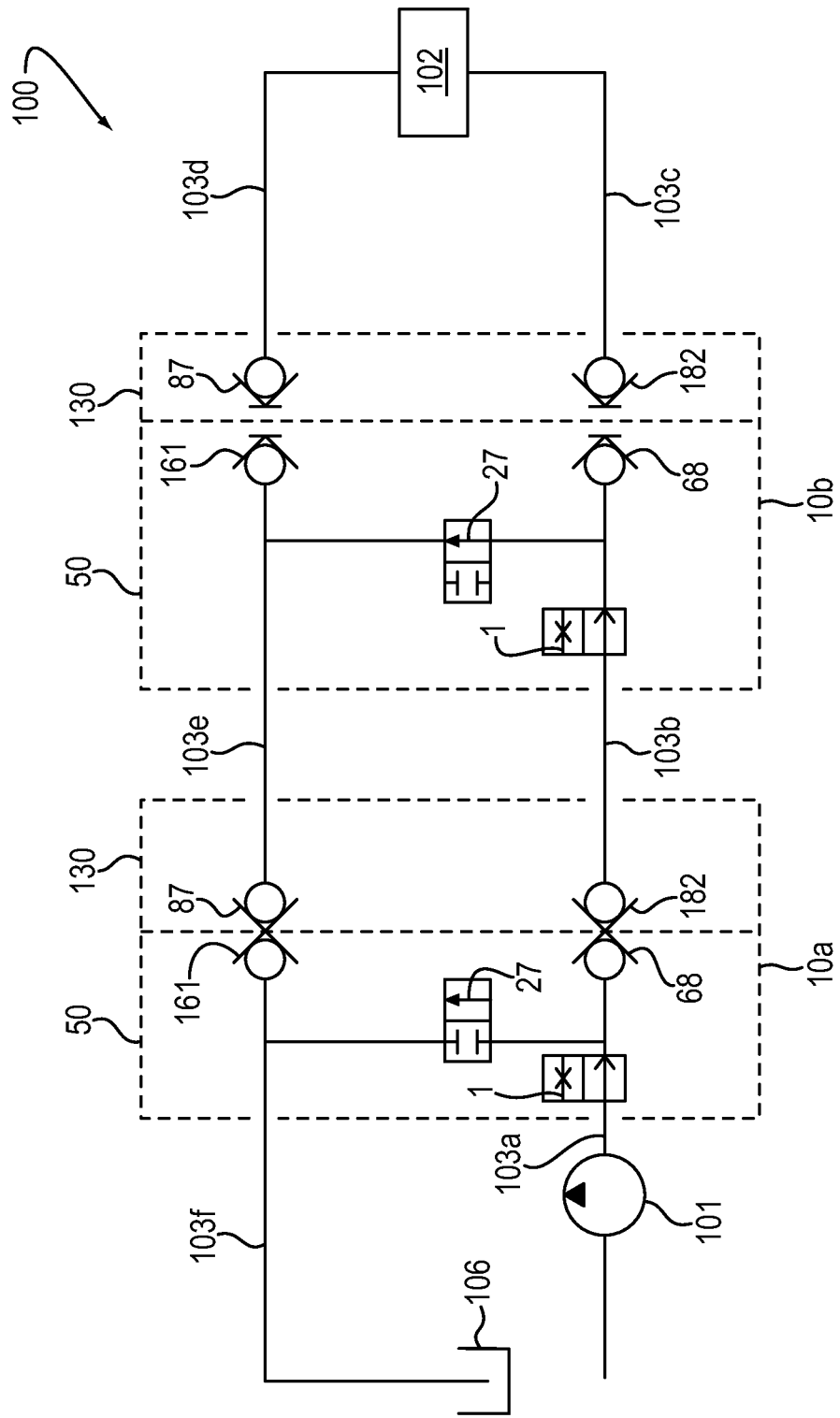
FIG. 9 is a schematic circuit diagram of a hydraulic circuit in which the coaxial coupling according to the present invention is incorporated.

The coupling 10 and its coupling halves 50 and 130 may be used in numerous hydraulic circuits, including but not limited to the hydraulic circuit 100 illustrated in FIG. 9. The hydraulic circuit 100 includes a known multiple stage hydraulic pump 101 that supplies hydraulic fluid under pressure to hydraulic equipment or tool or machine 102. The pump 101 may be driven by and located near the engine of a vehicle (not shown), such as, for example, an engine of a rescue vehicle. The pump 101 is arranged to operate in a first mode at a first or relatively higher output flow rate when the output pressure is below a first or relatively low output or demand pressure required to operate the equipment 102. When the output or demand pressure increases, such as by increased demand pressure from the equipment 102 that occurs when equipment 102 encounters an increased resistance, the pump 101 shifts to a second mode having a second or relatively lower output flow rate and a second or relatively higher output or demand pressure. The equipment 102 may be any hydraulic machine or equipment that uses hydraulic fluid power to perform work, such as, for example, a rescue tool used at industrial or motor vehicle accidents. When the hydraulic circuit 100 is fully connected as described below, the output hydraulic fluid from the pump 101 flows through a connection 103a to a first coupling 10a, from the first coupling 10a through a connection 103b to a second coupling 10b, from the second coupling 10b through a connection 103c to the equipment 102. The equipment uses the power supplied by the hydraulic fluid to perform work, and lower pressure hydraulic fluid is returned from the equipment 102 through connection 103d to coupling 10b, from coupling 10b through connection 103e to coupling 10a, and from coupling 10a through connection 103f to a low pressure reservoir 106 that returns the hydraulic fluid to the inlet side of the pump 101. Connections 103b and 103e in the circuit illustrated in FIG. 9 are preferably coaxial hoses, with hose 103b being the inner high pressure supply hose and hose 103e being the outer lower pressure return hose as is well known. Coupling half 130 of coupling 10a and coupling half 50 of coupling 10b each retain their hose fittings described above and illustrated in FIGS. 1-3, and those hose fittings are attached to the distal ends of the coaxial hoses. Coaxial hoses 103b and 103e may be one continuous length of coaxial hose, or they may be two or more lengths of coaxial hose connected together with quick connect couplings such as coupling 10. Connection or connector 103a is preferably a machined cavity (not shown) in the housing of pump 101. The hose fittings of coupling half 50 of coupling 10a are eliminated, and the sleeve 12 of coupling half 50 of coupling 10a is threadably secured directly to the housing of pump 101 at the machined cavity in the manner described above and illustrated generally in FIG. 8 of the Maldavs patents. Connection or connector 103f is preferably a machined passage (not shown) in the housing of pump 101. Connection or connector 103c is preferably a machined cavity (not shown) in the housing of equipment 102, and the body 146 of coupling half 130 of coupling 10b is threadably secured directly to the housing of equipment 102 in the manner described above and illustrated generally in FIG. 8 of the Maldavs patents. Connection or connector 103d is preferably a machined passage (not shown) in the housing of equipment 102.

One, or preferably both, of the couplings 10a and 10b in hydraulic circuit 100 are identical to the preferred embodiment for coupling 10 illustrated in FIGS. 1-3 or to any of the additional coupling embodiments illustrated in the other Figures herein. Each of the couplings 10a and 10b shown in FIG. 9 includes a female half 50 and a male half 130, as further described herein. When coupling 10a is to be connected in order to connect hoses 103b and 103e to hydraulic pump 101, its coupling half 50 is stationary because it is connected to stationary hydraulic pump 101, and its other coupling half 130 is moved into engagement with stationary coupling half 50 for fully connecting coupling 10a. When coupling 10b is to be connected, its coupling half 130 may be movable or stationary, and coupling halves 130 and 50 are moved into engagement for fully connecting coupling 10b. Accordingly, either or both half of a coupling 10a, 10b, for example, may be stationary or may be movable during connecting, depending upon the arrangement of the coupling in the hydraulic circuit in which it is used. Further, due to fluid flow and hose lengths and other circuit parameters, the sequence for connecting each coupling 10a, 10b may be slightly different from one another as further described below. In FIG. 9, coupling 10a is illustrated in a fully connected configuration described below, and coupling 10b is illustrated in a disconnected configuration. In this configuration, pump 101 is operating at its first operating mode with lower fluid pressure and higher fluid flow. The fluid from pump 101 flows through connected coupling 10a and through supply hose 103b to coupling half 50 of coupling 10b. Coupling half 50 of coupling 10b is in a disconnected configuration, and fluid flows through coupling half 50 and through hose 103e and back through coupling 10a to connection 103f and reservoir 106. The coupling sequence for coupling 10b under these conditions will now be explained.

Referring now to FIGS. 1-3, the coupling 10 and its coupling halves 50 and 130 have a connection sequence that starts with a disconnected configuration illustrated in FIG. 1, moves to a connection initiation configuration illustrated in FIG. 2, and then moves to a fully connected configuration illustrated in FIG. 3. The connection sequence also includes partially connected configurations between the connection initiation configuration of FIG. 2 and the fully connected configuration illustrated in FIG. 3. The partially connected configurations are not illustrated in the attached drawings but are described below.

When the coupling 10 and its coupling halves 50 and 130 are in the disconnected configuration of FIG. 1, the high pressure inner supply fluid valve of each coupling member and the low pressure outer return valve of each coupling member described above are each in a fully closed position to isolate fluid pressure communication between inner passages 26 and 166 of the coupling halves and between outer passages 53 and 151 of the coupling halves. The fully closed position for the high pressure supply fluid valve of each coupling member and for the low pressure return valve of each coupling member contemplates the position in which the components of these valves are in their illustrated engaged positions, before any substantial relative opening movement has occurred between the engaged components of these valves. Specifically, the outer surface of valve 68 engages the inner O-ring seal 95 of valve head 87 to close the supply valve of coupling member 50, sleeve 84 engages the outer seal 94 of valve head 87 to close the return valve of coupling member 50, element 182 engages O-ring 196 of body 170 to close the supply valve of coupling member 130, and member 161 engages seals 194 and 157 to close the return valve of coupling member 130. In the female coupling half 50 in this disconnected configuration, actuator spring 15 biases actuator member 14 and first flow tube 4a and valve head 3 to the right, to position and retain valve head 3 of restrictor 1 in its open position relative to valve seat 2. Fluid from the hydraulic pump 101 that is received in inner high pressure supply passages 26a and 26b of female coupling half 50 flows through such passages, through the open restrictor 1, through flow passages 27, and into outer low pressure return passage 53 to return to the reservoir 106 through passages 32 and 64. In the male coupling half 130, there is no fluid flow in the disconnected configuration. As mentioned above and further described below, each coupling half 50 and 130 includes a supply passage, which is the fluid passage of each coupling half that provides a high pressure fluid communication flow path that supplies hydraulic fluid from the outlet side of pump 101 to the equipment 102 when the coupling halves are fully connected, and a return passage, which is the fluid passage of each coupling half that provides a lower pressure fluid communication flow path that returns hydraulic fluid from the equipment 102 to the reservoir 106 and the inlet side of pump 101 when the coupling halves are fully connected.

When the coupling halves 50 and 130 are to be connected, the human operator moves the coupling halves against one another and relative to one another, from the disconnected configuration of FIG. 1 toward the connection initiation configuration illustrated in FIG. 2. When the operator pushes the coupling halves 50 and 130 together, opening movement to the right of the valve head 87 by engagement with body 170 is resisted by a force acting to the left on valve head 87 and/or other components of the female coupling half created by fluid pressure in outer return fluid passage 53. If the fluid pressure in outer return fluid passage 53 is relatively low, such as would occur under conditions of relatively low flow rates and/or relatively short hoses and/or relatively warm fluid temperatures, this resisting force will be relatively low and the restrictor 1 will not operate and will remain open in the position illustrated in FIG. 1 during connection. If this occurs, the connection initiation configuration illustrated in FIG. 2 will not be needed and will not be achieved, and the coupling 10 will operate and connect as described in the Maldavs patents.

However, if the fluid pressure in outer return fluid passage 53 is not as low as mentioned in the preceding paragraph, such as would occur under conditions of relatively higher flow rates and/or relatively longer hoses and/or relatively colder fluid temperatures, the described resisting force acting on the valve head 87 or other components of female coupling half 50 will be relatively greater. When this occurs, the structure and method according to the present invention further reduce the connecting force required to connect the coupling halves 50 and 130. Specifically, the connecting force created by the operator pushing the coupling halves 50 and 130 together will cause the sleeve 12 and actuator member 14 and first flow tube 4a and valve head 3 and fittings 58 and 63 to move together to the left, against the bias of the actuator spring 15, relative to the closed valves 68 and 80, 84, 86 of the inner and outer passages and relative to the flow tube 4b and body 54a, 54b, until the coupling 10 achieves the connection initiation configuration illustrated in FIG. 2. In the connection initiation configuration of FIG. 2, the inner high pressure valves of the coupling members 50 and 130 and the outer low pressure valves of the coupling members 50 and 130 remain in the closed positions described in the preceding paragraph. This will move the valve head 3 toward the valve seat 2, to at least partially close the restrictor 1. Full closing of the restrictor 1 is illustrated in FIG. 2, but it is to be understood that full closing is a theoretical maximum condition and that partial closing of the restrictor 1 will be a more typical condition in the connection initiation configuration of FIG. 2. Full closing might be achieved under some conditions, but this would shut off all fluid flow from pump 101 through coupling 10 and would result in the pump 101 connecting its output flow to reservoir 106 through its high pressure internal relief valve. When the restrictor 1 at least partially closes in the described manner in the connection initiation configuration of FIG. 2, a pressure drop will occur across restrictor 1 that will result in a decreased pressure downstream of the restrictor 1 and specifically a decreased pressure in outer return fluid passage 53. Further, when the restrictor 1 at least partially closes in the described manner in the connection initiation configuration of FIG. 2, the resulting increase in pressure upstream of restrictor 1 in passage portion 26a signals the pump 101 to operate in its second mode of operation with decreased outlet fluid flow rate and increased outlet fluid pressure. This signal to pump 101 is produced by coupling 10 independently of machine 102, and specifically independently of any load required or demanded by machine 102. The decreased fluid flow rate from the multistage pump 101 decreases the fluid flow rate through return passage 53 and through return hoses 103d and 103e and passage 103f, and this decreased fluid flow rate in turn decreases the return flow back pressure in passage 53 and the pressure in passage 26b. The decreased back pressure in passage 53 acting to the left on valve head 87 decreases the above described resisting force acting to the left on valve head 87 and/or on other components of female coupling half 50, resulting in decreased connecting forces required to move the coupling 10 from its connection initiation configuration shown in FIG. 2 toward its fully connected configuration shown in FIG. 3.

The connection initiation configuration illustrated in FIG. 2 only lasts for a short period of time during the connection sequence. The connection initiation configuration is achieved when the variable size flow restrictor 1 is at least partially closed in response to operator connection force when the fluid pressure level in the outer fluid pressure passage 53 exceeds a predetermined trigger fluid pressure level set by spring 15. Once the pressure in passage 53 and the resisting force acting to the left on valve head 87 decrease in the described manner, then continued pushing of the coupling halves 50 and 130 together by the human operator will cause the coupling members 50 and 130 to move from the connection initiation configuration through partially connected configurations illustrated in the Maldavs patents. In the partially connected configurations, the inner high pressure valves and the outer low pressure valves will sequence as described in the Maldavs patents and as illustrated in FIGS. 10-15 of the Maldavs patents until the coupling 10 reaches the fully connected configuration illustrated in FIG. 3 herein. As the coupling members 50 and 130 move from the connection initiation configuration through the partially connected configurations and to the fully connected configuration, pressure in passage 53 will decrease below the trigger pressure and the actuator spring 15 will return the sleeve 12 and actuator member 14 and first flow tube 4a and valve head 3 to the right relative to the second flow tube 4b to open the restrictor 1 when the connection force becomes less than the force exerted by actuator spring 15. When the fully connected configuration illustrated in FIG. 3 is reached, the above described high pressure inner valves and low pressure outer valves of each coupling half 50 and 130 are open to allow hydraulic fluid to flow from the hydraulic pump, through high pressure passage portion 26a, around flow surfaces 2 and 3 of restrictor 1, through high pressure passage portion 26b, through flow passages 27, between valve member 68 and body 170, between element 182 and body 170, through passage 166 to the rescue equipment or other tool 102 that is to be powered by the hydraulic fluid, back from the equipment or tool to passages 167 and 151, around valve head 87, through low pressure return passage 53 and passages 32, to return passage 64 and back to the fluid reservoir 106 that provides the input supply fluid for the pump 101. When the coupling 10 reaches its fully connected position and the restrictor 1 opens, the coupling 10 signals the pump 101 to move from its second mode back to its first mode, again independently of any load demand from machine 102.

During the described movement of the sleeve 12 and actuator member 14 and first flow tube 4a and valve head 3 (collectively "movable restrictor and actuator assembly") relative to the valve seat 2 and relative to the coupling body 54a, 54b, the pressures acting on the movable restrictor and on the actuator assembly are both substantially pressure balanced so that such pressures do not act against such movement. Pressure balancing on the restrictor is achieved by making the area of the valve seat 2 equal to the area of the seal on the outside diameter of the flow tube 4a that engages the inside diameter of the flow tube 4b. With respect to pressure balancing the actuator, the fluid pressure forces acting to the right as viewed in FIG. 2 on the movable restrictor and actuator assembly will be equal to the fluid pressure multiplied times the area of the internal seal on the spacer 31 of the flow tube 4b. The forces acting to the left on the movable restrictor and actuator assembly as viewed in FIG. 2 will be equal to the pressure multiplied times the annular area between the outside seal of the actuator member 14 against the inside of the body 54a and the inside seal of the body 54a against the actuator member 14. These forces are substantially equally pressure balanced in the embodiment illustrated in FIGS. 1-3. Alternatively, these areas could be modified so that the pressure acting against the relevant areas produces a small force unbalance that assists the operator in moving the coupling 10 to the fully coupled configuration illustrated in FIG. 3 to further reduce the required connection force.

Figure 4:
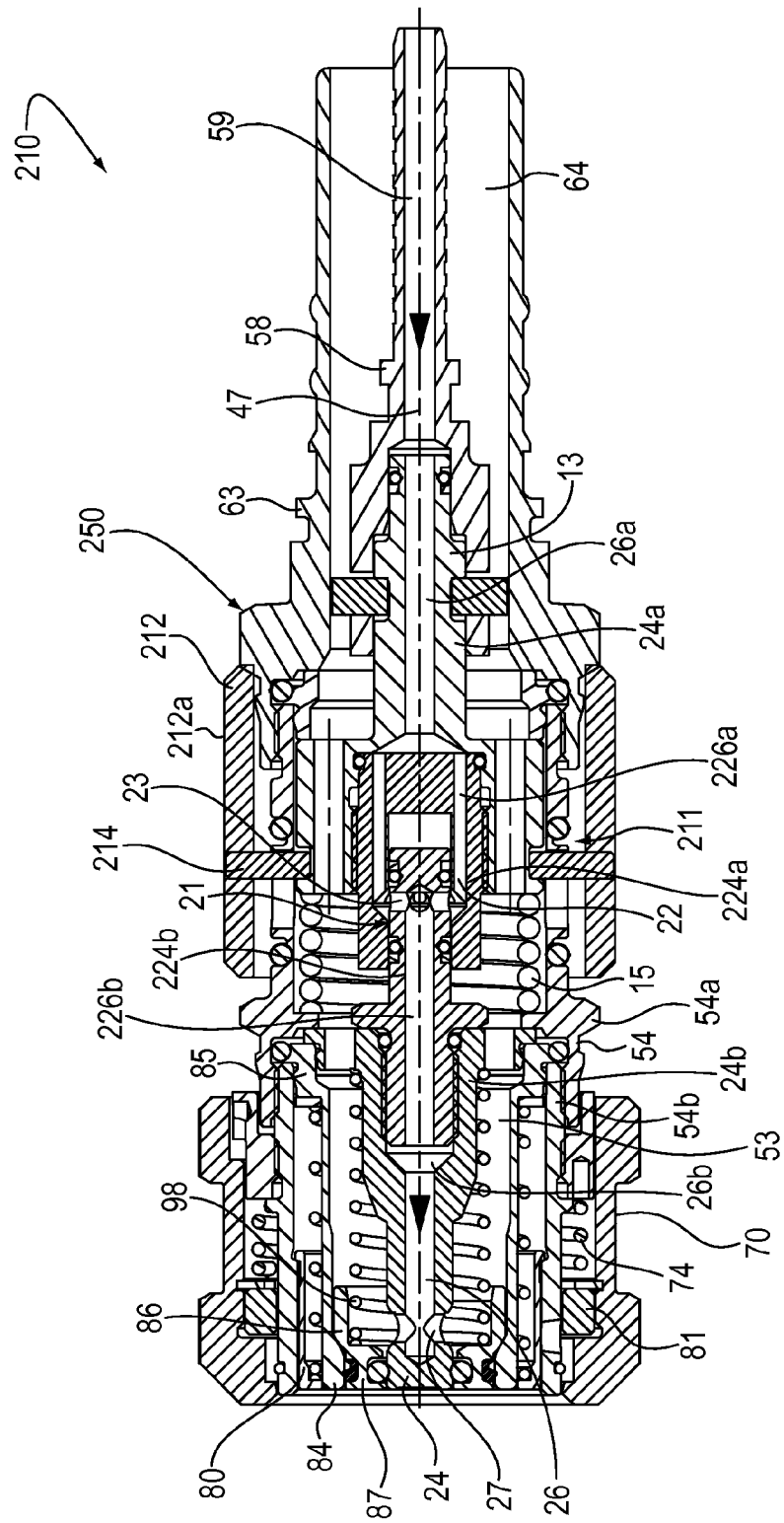
FIG. 4 is a longitudinal cross sectional view of a coaxial coupling according to a second embodiment of the present invention, showing one of the halves of the coupling in a disconnected configuration.

Turning now to FIG. 4, a second embodiment of a coupling 210 according to the present invention is illustrated. Only the female half 250 of the coupling 210 is illustrated in FIG. 4, and the complete coupling 210 also includes a male half identical to the male half 130 illustrated in FIGS. 1-3. Components of the coupling 210 that are substantially similar to components illustrated and described in connection with the coupling 10 are indicated by the same reference numbers shown in FIGS. 1-3. The coupling 210 operates in the same manner as the coupling 10, with the same sequence, and according to the same method as illustrated and described in connection with coupling 10, except as otherwise described below.

The present invention provides the coupling 210 with a variable size flow restrictor 21 and with a flow restrictor actuator 211. The flow restrictor 21 is upstream of the flow passage 27 that connects the inner high pressure fluid supply passage 26 with the outer low pressure fluid return or reservoir passage 53. The flow restrictor 21 includes a first flow restriction surface 22, which in the embodiment illustrated in FIG. 4 is an annular groove. The first flow restriction surface or annular groove 22 is machined on the inside surface of a blind bore that extends from the left end of a first flow tube extension 224a. The first flow tube extension 224a is generally cylindrical and is threadably secured to the first flow tube 24a so that the first flow tube 24a and the first flow tube extension 224a move together as a unit within body 54. The first flow tube extension 224a includes a plurality of circumferentially spaced passage extensions 226a which are extensions of the inner high pressure supply fluid passage 26a and which connect the portion of the passage 26a that is within the first flow tube 26a with the first flow restriction surface or annular groove 22. The flow restrictor 21 also includes a second flow restriction surface 23, which in the embodiment illustrated in FIG. 4 is a plurality of radial passages. The second flow restriction surface or radial passages 23 are machined in a second flow tube extension 224b. In the disconnected configuration illustrated in FIG. 4, the first flow restriction surface 22 is aligned with and spaced from the second flow restriction surface 23, so that fluid can flow between the flow surfaces 22 and 23 without substantial restriction. The second flow tube extension 224b is threadably secured to the second flow tube 24b, so that the second flow tube extension 224b and the second flow tube 24b are secured together in stationary engagement with the body 54. The second flow tube extension 224b includes a passage extension 226b which is an extension of the inner high pressure supply fluid passage 26b. The first flow restriction surface 22 is axially or longitudinally movable toward and away from the second flow restriction surface 23 to change the size of the variable flow restrictor 21. FIG. 4 illustrates the coupling 210 in a disconnected configuration, and the flow restrictor 21 in this configuration is fully open. The inner passage 26 provides a high pressure supply inner chamber or passage for the coupling 210 to receive and convey high pressure fluid from the fluid pump 101. The flow restrictor 21, including the first restrictor surface 22 and the second restrictor surface 23, is disposed intermediate the flow tubes 24a and 24b, upstream of the flow passage 27.

The first flow tube 24a (including first flow tube extension 224a) is longitudinally movable relative to the second flow tube 24b (including second flow tube extension 224b) and relative to the body 54a, 5b by operation of the actuator 211. The actuator 211 includes an actuator sleeve 212, which is axially or longitudinally movable relative to hose fitting 63 and relative to body 54a, 54b so that sleeve 212 moves relative to body 54a, 54b. The exterior surface 212a of sleeve 212 provides a gripping surface that may be gripped by a human operator to move the sleeve 212 relative to the exterior surface of fitting 63 and relative to the exterior surface of the low pressure hose (not shown) connected to the fitting 63. The actuator 211 further includes an actuator member 214 that consists of a plurality of pins that extend radially through radial holes in the sleeve 212 and through radial holes in an enlarged diameter annular shoulder on the left end of flow tube 24a, to connect the sleeve 212 and the flow tube 24a for longitudinal movement relative to body 54a, 54b and relative to flow tube 24b. The actuator member or pins 214 extend through longitudinal slots in body 54a to accommodate this relative movement. In this manner, sleeve 212 and actuator member 214 are connected to first flow tube 24a and its first flow restriction surface or annular groove 22, so that axial or longitudinal movement of sleeve 212 by action of the human operator causes flow restrictor surface 22 to move relative to flow restrictor surface 23 to close and open variable flow restrictor 21. An actuator spring 15 acts between body member 54a and sleeve 212, to bias sleeve 212 and actuator member 213 and first flow tube 24a and restrictor surface 23 to the right as viewed in FIG. 1, which biases the restrictor 21 to its open position.

When the coupling halves 250 and 130 are to be connected, the human operator grasps the sleeve 212 of the female half 250, and moves the coupling halves from the disconnected configuration illustrated in FIG. 4 toward the connection initiation configuration described above with reference to FIG. 2. The coupling halves 250 and 130 then operate in substantially the same manner as the coupling halves 50 and 130 described above, except that the flow restrictor surfaces 22 and 23 of the FIG. 4 embodiment perform the flow restriction and pressure reduction functions described above as performed by the flow restrictor surfaces 2 and 3 of the FIG. 1-3 embodiment. The coupling halves 250 and 130 of the second embodiment of the invention in this manner move from the disconnected configuration of FIG. 4, to a connection initiation configuration, to partially connected configurations, and to a fully connected configuration, as described above with reference to the first embodiment of FIGS. 1-3. Pressure balancing for the coupling half 250 is provided by the equal diameters on each longitudinal side of the flow restrictor 21.

Figure 5:
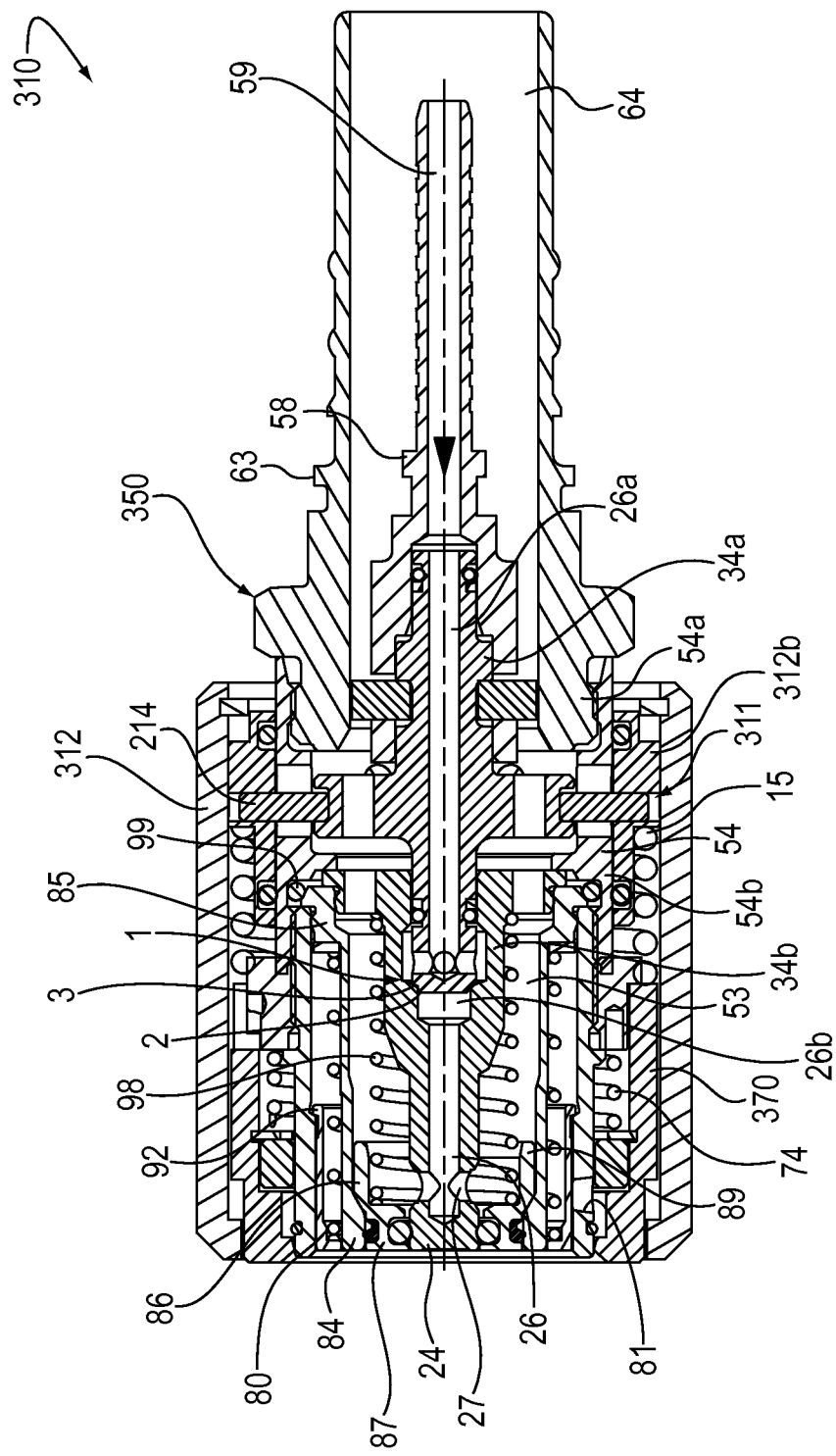
FIG. 5 is a longitudinal cross sectional view of a coaxial coupling according to a third embodiment of the present invention, showing one of the halves of the coupling in a connection initiation configuration.

Turning now to FIG. 5, a third embodiment of a coupling 310 according to the present invention is illustrated. Only the female half 350 of the coupling 310 is illustrated in FIG. 5, and the complete coupling 310 also includes a male half identical to the male half 130 illustrated in FIGS. 1-3. Components of the coupling 310 that are substantially similar to components illustrated and described in connection with the coupling 10 are indicated by the same reference numbers shown in FIGS. 1-3. Components of the coupling 310 that are substantially similar to components illustrated and described in connection with the couplings 10 and 210 are indicated by the same reference numbers shown in FIGS. 1-4. The coupling 310 combines a restrictor 1 having a valve head 3 and valve seat 2 of the type used in FIGS. 1-3, with an actuator 311 that is similar to the actuator 211 used in FIG. 4. The restrictor 1 of the coupling 310 operates in the substantially the same manner as in the couplings 10 and 210, with the same sequence, and according to the same method as illustrated and described in connection with couplings 10 and 210. The actuator 311 of the coupling 310 operates in substantially the same manner as the actuator 211 of the coupling 210, except as illustrated in FIG. 5 and explained below. An outer sleeve 312 extends over a locking sleeve 370 and over an actuator sleeve 312b, and actuator spring 15 is radially intermediate sleeves 312 and 312b. During connection, the outer sleeve 312 operates the restrictor 1. During disconnection, the outer sleeve 312 acts on locking sleeve 370 to allow release of the locking balls and unlocking the coupling. Pressure balancing is provided by the substantially equal areas of the restrictor 1 and O-ring seal between first flow tube 34a and second flow tube 34b. FIG. 5 illustrates the coupling 310 in the connection initiation configuration, and the flow restrictor 1 in this configuration is closed with the surface 2 spaced its minimum distance away from the surface 3 to restrict flow through the restrictor 1.

Figure 6:
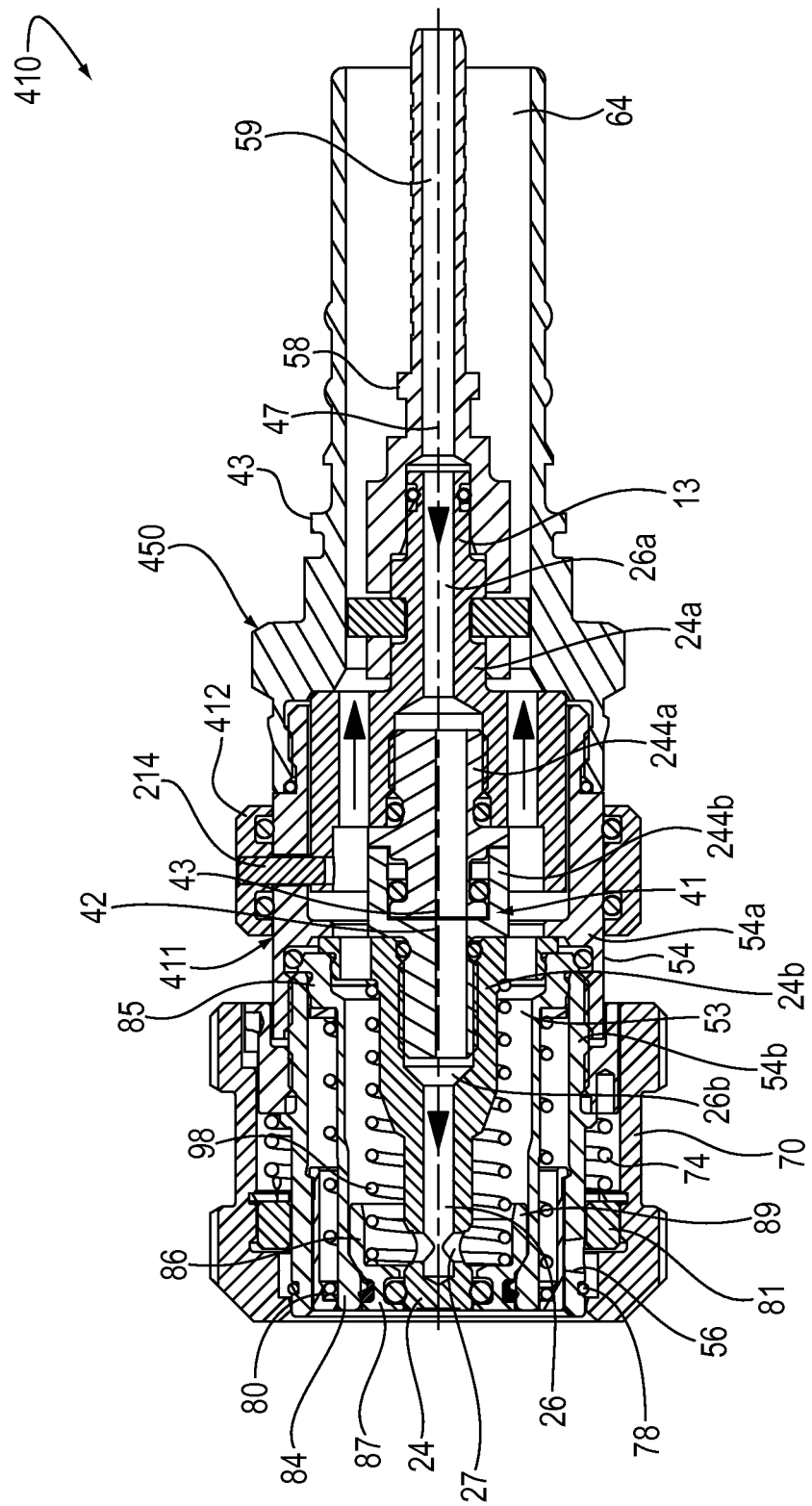
FIG. 6 is a longitudinal cross sectional view of a coaxial coupling according to a fourth embodiment of the present invention, showing one of the halves of the coupling in a disconnected configuration.
Figure 7A:
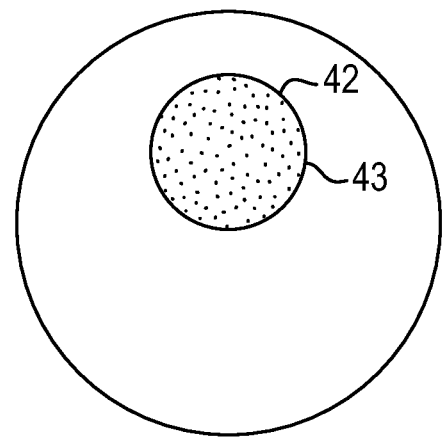
FIG. 7a is an enlarged schematic representation of restrictor flow surfaces in the fourth embodiment of the invention shown in FIG. 6, with the flow surfaces aligned for relatively unrestricted fluid flow through the restrictor.
Figure 7B:
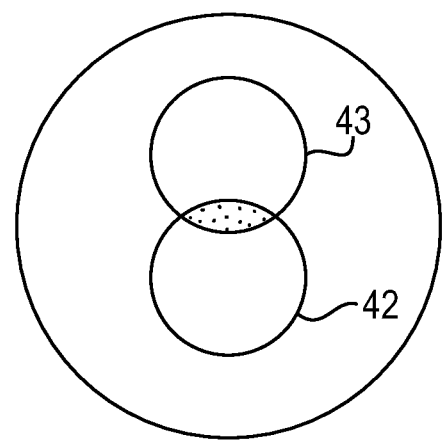
FIG. 7b is an enlarged schematic representation of the restrictor flow surfaces in the fourth embodiment of the invention shown in FIG. 6, with the flow surfaces rotated out of alignment for relatively restricted fluid flow through the restrictor.

Turning now to FIGS. 6, 7a and 7b, a fourth embodiment of a coupling 410 according to the present invention is illustrated. Only the female half 450 of the coupling 410 is illustrated in FIG. 5, and the complete coupling 410 also includes a male half identical to the male half 130 illustrated in FIGS. 1-3. Components of the coupling 410 that are substantially similar to components illustrated and described in connection with the couplings 10 and 210 are indicated by the same reference numbers shown in FIGS. 1-4. The coupling 410 in FIG. 5 incorporates a twist to restrict feature with a sleeve arrangement similar to FIG. 4. Specifically, an actuator 411 includes an actuator sleeve 412 that is rotated relative to body 54a, 54b to move a restrictor 41 between an open position when the coupling 410 is in its disconnected and fully connected configurations and a closed position when the coupling 410 is in its connection initiation configuration. A torsion spring (not shown) may be used to bias sleeve 412 to its position illustrated in FIG. 6. Actuator member or pins 214 are arranged in radial holes in sleeve 412 and in radial holes in first flow tube 24a. Pins 214 extend through a circumferential slot in body 54a, to allow rotation of sleeve 412 and pins 214 and first flow tube 24a relative to body 54a, 54b and relative to second flow tube 24b. First flow tube 24a includes a first flow tube extension 244a that is threadably secured to flow tube 24a so that flow tube 24a and flow tube extension 244a rotate together as a unit when sleeve 412 is rotated by the human operator. Second flow tube 24b includes a second flow tube extension 244b that is threadably secured to flow tube 24b. Restrictor 1 includes a first flow restriction surface 43 which is a radially offset passage 43 in first flow tube extension 244a, and a second flow restriction surface 42 which is a radially offset passage 42 in second flow tube extension 244b. When coupling 410 is in its disconnected configuration and in its fully connected configuration, flow restriction surfaces or passages 42 and 43 are aligned to provide substantially unrestricted flow. This condition is illustrated in FIG. 7a, which illustrates alignment of passages 42 and 43 and flow through the relatively unrestricted area indicated by shading. To actuate restrictor 41, the operator twists or rotates sleeve 412 to rotate first flow tube 24a (including its flow tube extension 244a and its first flow restriction surface 43) relative to stationary second flow tube 24b (including its flow tube extension 244b and its second flow restriction surface 42). This moves flow restriction surfaces 43 and 42 out of alignment, so that fluid flow can only occur through the relatively small portion of the surfaces 43 and 42 that is aligned and illustrated by shading in FIG. 7b. If desired, a circumferential spring can be used to bias sleeve 412 to its position shown in FIG. 6, which would bias restrictor surfaces 42 and 43 to their open position illustrated in FIGS. 6 and 7a.

Turning now to FIG. 8, a fifth embodiment of a coupling 510 according to the present invention is illustrated. Only the female half 550 of the coupling 510 is illustrated in FIG. 5, and the complete coupling 510 also includes a male half identical to the male half 130 illustrated in FIGS. 1-3. Components of the coupling 510 that are substantially similar to components illustrated and described in connection with the coupling 10 are indicated by the same reference numbers shown in FIGS. 1-3. The coupling 510 incorporates a radially movable restrictor 51 that operates in a manner similar to an on off spool selector valve that is actuated by a ramp surface on a sleeve. Specifically, an actuator 511 includes an actuator sleeve 512 that is longitudinally movable relative to body 54a, 54b to move a restrictor 51 between an open position when the coupling 510 is in its disconnected and fully connected configurations and a closed position when the coupling 510 is in its connection initiation configuration. Actuator member or conical ramp 514 is arranged in coaxial relation to actuator sleeve 512. Actuator spring 515 acts between conical ramp member 514 and locking sleeve 570, so that one spring provides both a spring bias for actuator member 514 and a spring bias for locking sleeve 570 to bias locking sleeve 570 to a locked position holding locking balls 82 in a locked position. Restrictor 51 includes a first restrictor surface 552 that is a radial hole that intersects high pressure inner passage 26 intermediate passage portion 26a and 26b. Restrictor 51 also includes a second restrictor surface 553 that is an annular groove on the exterior surface of a cylindrical spool. A spring 53a biases the spool upward as viewed in FIG. 8, against the conical actuator member 514. The coupling member 510 is shown in FIG. 8 in its disconnected configuration, with the restrictor 51 in an open position to permit substantially unrestricted fluid flow from first high pressure supply passage portion 26a to second high pressure supply passage portion 26b. In the FIG. 8 embodiment, first and second flow tubes 554a and 554b are of a single piece construction and the passage portions 26a and 26b extend through the single piece flow tube 554a, 554b. To actuate restrictor 51 when coupling 510 is moved from its disconnected configuration to its connection initiation configuration under conditions of relatively higher back pressure in outer low pressure return passage 53, the force created by the operator pushing sleeve 512 toward the left will move the actuator conical member 514 to the left against spring 515 so that spring 52 pushes first flow restrictor surface 53 upward to at least partially close restrictor 51 and reduce back pressure in low pressure return passage 53 in the manner described above with respect to FIGS. 1-3.

As described above, the various disclosed embodiments 10, 210, 310, 410 and 510 of the present invention reduce back pressure in low pressure return fluid passage 53 to provide a further reduced coupling connection force under conditions of high flow and/or long hoses and/or low temperatures. The various structures of the disclosed embodiments can be intermixed, so that, for example, the flow restrictor (1, 21, 31, 41, 51) of one of the embodiments can be used with the actuator (11, 211, 311, 411, 511) of another embodiment. Also, while the various embodiments of the invention are described above in the context of coaxial couplings, it should be understood that other embodiments of the invention may utilize non-coaxial coupling arrangements. In such non-coaxial arrangements, for example, parallel quick couplings may be provided for supply fluid flow and for return fluid flow with the couplings mounted in a multi-coupling connector block of the type generally described in U.S. Pat. No. 6,619,021. In such non-coaxial or parallel coupling arrangements, it is contemplated that the restrictor described above herein would be arranged in the connector block of the referenced patent with the female coupling members, and such coupling arrangements would be used in a hydraulic circuit of the type generally described with reference to FIG. 9 herein. The restrictor in such a non-coaxial coupling arrangement would be upstream of the high pressure supply coupling valve (just as in the described coaxial coupling arrangements), and the actuator for the restrictor would be actuated at a connection initiation configuration described above to reduce fluid pressure on the female coupling and to signal the hydraulic pump to move from its described first mode to its described second mode to reduce connecting forces on the couplings. Also, the various embodiments are described in the context of one coupling member and certain coupling components moving, and it is to be understood that the described relative movement can be effected by either coupling member and other coupling components moving or by simultaneous movement. Further, while presently preferred embodiments of the invention are shown and described in detail above, the invention is not limited to these specific embodiments. Various changes and modifications can be made to this invention without departing from its teachings, and the scope of this invention is defined by the claims set out below. Further, separate components illustrated in the drawings may be combined into a single component, and single components may be provided as multiple parts.

The invention claimed is:

1. A fluid coupling member having a connection sequence starting with a disconnected configuration and moving to a connection initiation configuration and then to a fully connected configuration, the coupling member comprising:
   a supply fluid passage,
   a supply valve in fluid communication with the supply fluid passage, the supply valve having a fully closed position to fully close fluid communication between the supply fluid passage and a first flow passage of an adjacent coupling member and an open position to establish such fluid communication,
   a restrictor in fluid communication with the supply fluid passage upstream of the supply valve, the restrictor having an open position to open fluid flow through the supply fluid passage and an at least partially closed position to at least partially close fluid flow through the supply fluid passage,
   the supply valve being in its fully closed position in the disconnected configuration and in the connection initiation configuration, the supply valve being in its open position in the fully connected configuration,
   the restrictor being in its open position in the disconnected configuration and in the fully connected configuration, and the restrictor being in its at least partially closed position in the connection initiation configuration.

2. The fluid coupling member as set forth in claim 1, including
   a return fluid passage,
   a return valve in fluid communication with the return fluid passage, the return valve having a fully closed position to fully close fluid communication between the return fluid passage and a second flow passage of an adjacent coupling member and an open position to establish such fluid communication, the return valve being fully closed in the disconnected configuration and in the connection initiation configuration, and the return valve being open in the fully connected configuration.

3. The fluid coupling member as set forth in claim 1, including a coupling body, and the supply fluid passage and return fluid passage are coaxial within the coupling body.

4. The fluid coupling member as set forth in claim 1, wherein the restrictor is a variable size flow restrictor having flow surfaces movable relative to one another.

5. The fluid coupling member as set forth in claim 1, including an actuator member for moving the restrictor between its open and at least partially closed positions.

6. The fluid coupling member as set forth in claim 5, wherein the actuator includes an actuator spring, and the actuator spring biases the actuator member to bias the flow surfaces toward an open position.

7. The fluid coupling member as set forth in claim 1, wherein the supply fluid passage includes a first supply fluid passage portion and a second supply fluid passage portion, and the restrictor is disposed intermediate the first and second supply fluid passage portions.

8. The coupling member as set forth in claim 7 wherein the first and second supply fluid passage portions are longitudinally movable relative to one another.

9. The coupling member as set forth in claim 1, including a first fluid flow tube on one side of the restrictor that defines one portion of the supply fluid passage, a second fluid flow tube on the other side of the restrictor that defines another portion of the supply fluid passage, and the flow tubes are longitudinally movable relative to one another to move the restrictor between its open and its partially closed positions.

10. The coupling member as set forth in claim 4, including a first fluid flow tube on one side of the restrictor that defines one portion of the supply fluid passage, the first flow tube carries one of the flow surfaces, a second fluid flow tube on the other side of the variable size flow restrictor that defines another portion of the supply fluid passage, the second fluid flow tube carries the other of the flow surfaces, an actuator member is connected to the first flow tube, and the first flow tube is longitudinally movable relative to the second flow tube by operation of the actuator to move the flow surfaces between the open and the at least partially closed positions.

11. The coupling as set forth in claim 5, wherein the actuator member is substantially pressure balanced.

12. The coupling as set forth in claim 10, wherein the first flow tube is substantially pressure balanced.

13. The coupling as set forth in claim 9, including a first connector in fluid communication with the supply fluid passage, and one of the flow tubes is longitudinally movable relative to the first connector.

14. The coupling as set forth in claim 13, including a second connector in fluid communication with the return fluid passage, and the one of the flow tubes is longitudinally movable relative to the second connector.

15. The coupling member as set forth in claim 9, wherein the supply valve and a return valve are movable together relative to at least one of the flow tubes.

16. The fluid coupling member as set forth in claim 4, wherein one of the flow surfaces is a valve head and the other flow surface is an annular valve seat.

17. The fluid coupling member as set forth in claim 3, including an actuator for moving the restrictor between its open and at least partially closed positions, the actuator includes a sleeve, and the sleeve is movable relative to the body.

18. The fluid coupling member as set forth in claim 17, wherein the restrictor is a variable size flow restrictor having flow surfaces movable relative to one another, one of the flow surfaces is rigidly connected to the sleeve, and another of the flow surfaces is rigidly connected to the body.

19. The fluid coupling member as set forth in claim 17, wherein the sleeve is rotatably movable relative to the body.

20. The fluid coupling member as set forth in claim 19, wherein the flow surfaces include non-concentric openings rotationally movable relative to one another.

21. The fluid coupling member as set forth in claim 1, further including a second coupling member, the second coupling member includes a second supply fluid passage, a second supply valve in fluid communication with the second supply fluid passage, the second supply valve has a closed position to fully close fluid communication between the second supply fluid passage and the first mentioned supply fluid passage and an open position to establish such fluid communication.

22. The coupling member as set forth in claim 21, wherein the second coupling member includes a second return fluid passage, a second return valve in fluid communication with the second return fluid passage, the second return valve has a closed position to close fluid communication between the second return fluid passage and the first mentioned return fluid passage and an open position to establish such fluid communication, the second return valve being closed in the disconnected configuration and in the connection initiation configuration, and the second return valve being open in the fully connected configuration.

23. The fluid coupling member as set forth in claim 21, further including, a variable displacement hydraulic fluid pump having an output supply side and an input return side, the hydraulic fluid pump having a first output mode with higher fluid flow at its output supply side and a second output mode with lower fluid flow at its output supply side, a hydraulic machine having a fluid supply side and a fluid return side, the first mentioned fluid coupling member has its supply passage in fluid communication with the pump output supply side and has its return fluid passage in fluid communication with the pump input return side, the second mentioned fluid coupling member has its supply fluid passage in fluid communication with the hydraulic machine supply side and has its return fluid passage in fluid communication with the hydraulic machine return side, the restrictor is disposed intermediate the hydraulic pump outlet side and the first mentioned supply passage, the restrictor is in its at least partially closed position and signals the pump to move from its first output mode to its second output mode when the first mentioned coupling is in its connection initiation configuration, and the restrictor is in its open position when the coupling members are in their fully coupled configuration.

24. A hydraulic fluid circuit comprising, a variable displacement hydraulic fluid pump having an output supply side and an input return side, the hydraulic fluid pump having a first output mode with higher fluid flow rate at its output supply side and a second output mode with lower fluid flow rate at its output supply side, a reservoir in fluid communication with the pump input return side, a hydraulic machine having a supply side and a return side, and a coaxial coupling establishing fluid communication between the pump supply side and the machine supply side and between the machine return side to the reservoir, the coaxial coupling including a supply fluid passage, a return fluid passage coaxially disposed relative to the supply fluid passage, a flow passage connecting the supply and return fluid passages so that fluid can flow from the supply fluid passage through the flow passage to the return fluid passage, and a variable size flow restrictor upstream of the flow passage.

25. The hydraulic circuit as set forth in claim 24, wherein the coupling member has a connection sequence starting with a disconnected configuration and moving to a connection initiation configuration and then to a fully connected configuration, the variable size flow restrictor is in an open position when the coupling member is in the disconnected configuration, and the variable size flow restrictor is at least partially closed to cause the hydraulic pump to move from its first mode to its second mode when the coupling member is in the connection initiation configuration.

26. The hydraulic circuit as set forth in claim 25, including a supply valve in fluid communication with the supply fluid passage, a return valve in fluid communication with the return fluid passage, the return valve is coaxially disposed relative to the supply valve, the supply valve and the return valve each have a closed position when the coupling member is in the disconnected configuration and when the coupling member is in the connection initiation configuration, the supply and return valves each have an open position when the coupling member is in its fully connected configuration, and the variable size flow restrictor is in its open position when the coupling member is in its fully connected configuration and its disconnected configuration.

27. A method of connecting first and second coupling members together, wherein the first coupling member includes a first supply fluid passage connected to an outlet of a hydraulic pump, and the second coupling member includes a second supply fluid passage for being connected to a hydraulic machine, comprising the steps of, moving the first and second coupling members sequentially from a disconnected configuration to a connection initiation configuration to a fully connected configuration, preventing fluid pressure communication between the first and second supply fluid passages in the disconnected configuration and in the connection initiation configuration, at least partially closing fluid pressure communication between the hydraulic pump outlet and the first supply fluid passage in the connection initiation configuration, and opening fluid pressure communication between the pump outlet and the first supply fluid passage and between the first and second supply fluid passages in the fully connected configuration.

28. The method as set forth in claim 27, wherein the method takes place in a hydraulic circuit that includes the hydraulic pump, the hydraulic pump has a first mode with a first output and a second mode with a second output, including the additional step of signaling the pump by operation of the coupling independently of the hydraulic machine to move from the first mode to the second mode when the coupling moves from the disconnected configuration to the connection initiation configuration.

29. The method as set forth in claim 28, including the additional step of signaling the pump by operation of the coupling independently of the hydraulic machine to move from the second mode to the first mode when the coupling moves from the connection initiation configuration to the fully connected configuration.

\* \* \* \* \*